United States Patent Office 3,162,510
Patented Dec. 22, 1964

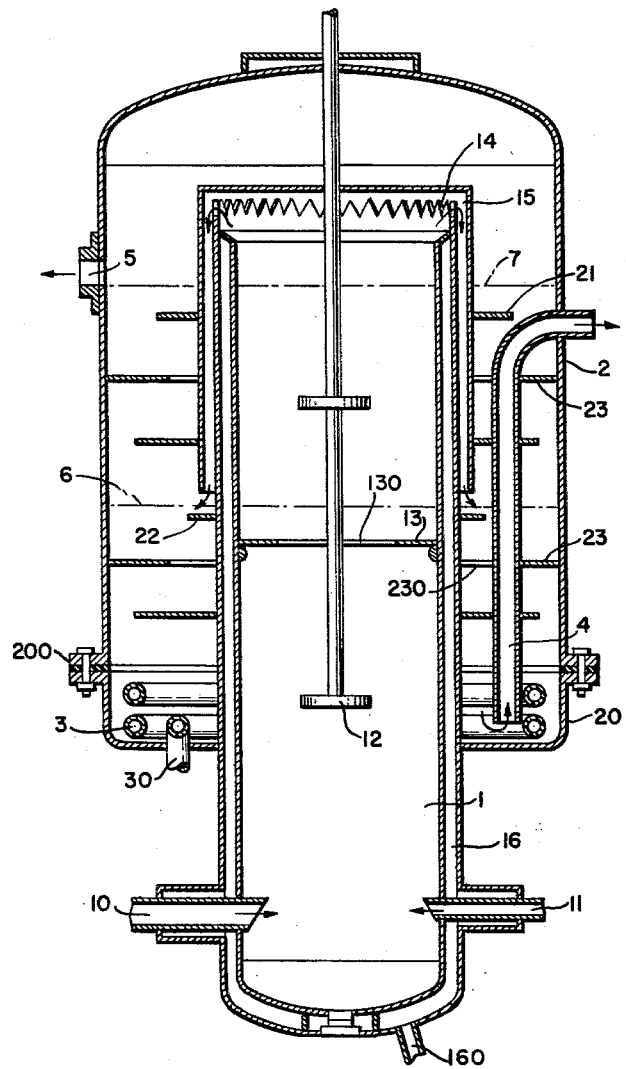

3,162,510
MIXING AND SEPARATING APPARATUS
Fritz Meissner, Cologne-Marienburg, Norbert Rudolph, Rodenkirchen (Rhine), and Helmut Becker, Cologne, Germany, assignors to Josef Meissner, Cologne-Bayenthal, Germany, a firm
Filed Nov. 28, 1960, Ser. No. 72,070
Claims priority, application Germany, Dec. 3, 1959, M 43,585
3 Claims. (Cl. 23—267)

This invention relates to equipment for emulsification or extraction, comprising a mixing vessel and a separating device. More particularly the invention concerns a device comprising a mixing vessel and a separator adapted for the emulsification of two or more media and for their subsequent separation from each other, or for the extraction of one medium by another, the various media differing specifically from each other in respect to specific gravity.

Equipment for emulsification or extraction of the character described is particularly useful in the manufacture of explosives. It is used for washing as well as for extraction and conventionally consists of a number of mixing or washing vessels and separation vessels. In the manufacturing process these separate vessels are interconnected. The art has sought an apparatus adapted for mixing and separation in which the various units would be combined into a single piece of equipment.

In the hitherto known mixing and separation facilities, the mixing vessel and the separating vessel were located side by side. Accordingly, they had to be heated separately and connected with each other by corresponding piping which also required separate heat insulation.

It is accordingly an object of the invention to provide an apparatus for emulsification or extraction in which a mixing vessel and a separator are united in a single piece of equipment.

Another object of the invention is the provision of a combined mixing and separating apparatus in which the mixing and separating sections are heated together and which reduces exposed piping to a minimum.

Still another object of the invention is the structural combination of both the mixing and the separating vessels in such manner that one is located inside the other and with the mixing vessel provided with an overflow member which discharges into the separator.

Still another object of the invention is to provide equipment of the character described in which the combination of mixing and separating vessels possesses the considerable advantage of requiring greatly reduced amount of floor space.

Another advantage of the present invention is that additional piping is no longer required since the liquid discharges from the mixing vessel directly into the separator through a simple overflow member.

Another important advantage derived from this structural combination is that it makes possible the heating of both vessels by means of the hollow wall which separates them from each other, whereby the media in both the inner and outer vessels are heated to the same degree. Another advantage is that exterior insulation of the two vessels is unnecessary. Still another advantage is that it is unnecessary to provide piping leading from the mixing to the separating vessel which in heretofore known equipment required additional heating and insulation in order to maintain the material being heated in the equipment at the proper temperature. Accordingly in the novel apparatus of the present invention the overall heat economy is significantly improved.

Other objects and advantages of the invention will appear as the description proceeds.

For a better understanding of the invention and its various objects, advantages, and details, reference is now made to the present preferred embodiment of the invention which is shown, for purposes of illustration only, in the accompanying drawing.

The drawing is a diagrammatic view in vertical sectional elevation of the preferred form of the apparatus. As will be seen from the drawing, the mixing vessel 1 and the separating vessel 2 are arranged so that the latter is superimposed coaxially and concentrically, so as to form a single structural unit. Advantageously the inner vessel serves as the mixing or washing or extracting chamber, to which the respective media are supplied, while the outer vessel serves as the separating chamber.

The apparatus of this invention embodies a particularly simple and effective form of construction wherein the outer, or separating vessel is divided horizontally into two portions whereby either the upper or lower portion can be separated or lifted away from the remaining portion. It is advantageous to arrange the sectional plane at the lower part of the vessel, thus making it easy to clean out the lower portion. This is especially advantageous where the apparatus is used for washing aromatic nitro compounds, and the ensuing description of the apparatus and its mode of operation will be illustrated with respect to the washing of such compounds.

In accordance with the drawing, vessel 1 forms a washing column and is provided with inlet 10 through which the material to be washed, for example, an aromatic nitro compound, is supplied. Washing agent is supplied to column 1 through inlet 11. Column 1 is provided with stirring apparatus 12 for intimate mixing of the two liquids. The column is provided at its middle portion with an intermediate baffle 13 which contains a wide central opening 130. The baffle 13 thus divides the vessel into two parts whereby the washing operation is carried out in two stages in a single vessel.

The upper periphery 14 of vessel 1 is serrated so as to achieve a uniform overflow of the mixture along its entire circumference. Fastened to this edge or periphery 14 is an annular jacket 15 whereby the overflowing liquid is led into the outer vessel 2.

Vessel 1 is provided with a hollow jacket 16 in which a suitable heating medium circulates, said heating medium entering the jacket via inlet 160.

The outer or separating vessel 2 is provided with separating or stabilizing plates 21, 22, 23, of which plates 21 and 22 are fastened to the jacket 16 of the inner vessel 1, and extend outward therefrom, while plates 23 extend all the way across from jacket 16 to the outer wall of vessel 2, and are provided with openings 230. The arrangement of the plates or their openings is such that the path of the media is made to change direction from the vertical by means of each plate.

Vessel 2 is divided into two parts by junction 200, namely, an upper portion and a relatively shallow bottom portion, the latter being identified at 20. In this way the assembly as well as the cleaning or repair of the vessel is facilitated by simply separating these two portions. In the region of the bottom portion 20 of the separating vessel 2 there is arranged a suitable heating coil 3 which is connected via a suitable conduit (not shown) with the upper edge of jacket 16 so that the heating medium enters at inlet 160 and is withdrawn at outlet 30.

The exit conduit for the medium of higher specific gravity is shown at 4. Since this pipe 4 in accordance with the embodiment of the invention shown lies within vessel 2 and is continually washed by warm liquid therein, the exiting liquid in turn remains warm.

The operation of the equipment of this invention is as follows: The liquids to be mixed are brought together into vessel 1 via inlets 10 and 11, and rise through the inner portion of vessel 1 being brought into intimate contact with each other during their passage. Suitably a heating medium circulates through hollow jackets 16 and coil 3, thereby preventing cooling of the liquids, or, if desired, warming them further during their stay in vessels 1 and 2.

The liquid mixture overflowing at upper edge 14 is led through hollow annular jacket 15 into the separating vessel at a height indicated by the numeral 6, at which point the two media of different specific gravities begin to separate. Stabilizing plate 22 located just underneath the opening of annular jacket 15 slows down the outflow of the mixed liquids. The other horizontally arranged plates 21 and 23 perform the same function. Gradually coming to rest, the two liquids which were mixed together in vessel 1, become separated, with the medium of higher specific gravity forming the lower layer, and the lighter medium rising above it, as each plate exerts its retarding effect.

5 indicates the point of overflow or removal of the liquid of lighter specific gravity.

While the present preferred embodiment of the invention has been illustrated and described, it will be recognized that the invention may be otherwise variously embodied and practiced within the scope of the following claims.

What is claimed is:

1. Apparatus for the mixing and separation of liquids of different specific gravities, comprising, in combination: a mixing vessel and a separating vessel, said separating vessel having a bottom region and said mixing vessel being located within and projecting downwardly beyond said bottom region of said separating vessel; inlet means communicating with said mixing vessel for introducing unmixed liquids; overflow means for conveying mixed liquids from the mixing vessel to the separating vessel; outlet means communicating with said separating vessel for removing fractions of different specific gravities, said outlet means including at least two outlets each for a respective one of said fractions of different gravities; and heating means common to both of said vessels for heating the mixed liquids in said mixing vessel and the respective fractions of different specific gravities in said separating vessel, said heating means including a heating jacket surrounding the wall of said mixing vessel throughout substantially the entire length thereof and thus being located at the interior of said separating vessel, said heating jacket constituting the sole heating means for said mixing vessel as well as for at least so much of said separating vessel as is located above said bottom region thereof.

2. The apparatus of claim 1 wherein said heating means further include additional heating means located in said bottom region of said separating vessel.

3. The apparatus of claim 1 wherein said separator has, in said bottom region, a bottom wall mounted on said mixing vessel; wherein said inlet means communicate with said mixing vessel at that portion thereof which projects downwardly beyond said separating vessel; wherein said means for conveying mixed liquid from said mixing vessel to said separating vessel are connected to said mixing vessel; wherein said outlet means are connected to said separator; and wherein baffle plates are arranged within said separating vessel, said baffle plates being connected to said mixing vessel.

References Cited by the Examiner

UNITED STATES PATENTS

| | | | |
|---|---|---|---|
| 1,390,677 | 9/21 | De Baufre. | |
| 1,686,076 | 10/28 | Evans | 23—309 |
| 2,055,836 | 9/36 | Cowles | 23—309 |
| 2,153,507 | 4/39 | Mann | 23–270.5 X |
| 2,363,834 | 11/44 | Crater | 23—266 |
| 2,405,158 | 8/46 | Mensing | 23–270.5 X |
| 2,630,376 | 3/53 | Dunn | 23–270.5 X |
| 2,667,407 | 1/54 | Fenske | 23–270.5 |
| 2,681,269 | 6/54 | Bergstrom | 23–270.5 |
| 2,684,762 | 7/54 | Silley et al. | 210–187 |

FOREIGN PATENTS 933,652  9/55  Germany.

NORMAN YUDKOFF, *Primary Examiner.*

GEORGE D. MITCHELL, HERBERT L. MARTIN, *Examiners.*